(12) United States Patent
Garner

(10) Patent No.: US 10,934,850 B2
(45) Date of Patent: Mar. 2, 2021

(54) TURBINE BLADE HAVING AN ADDITIVE MANUFACTURING TRAILING EDGE

(71) Applicant: DOOSAN HEAVY INDUSTRIES & CONSTRUCTION CO., LTD., Changwon-si (KR)

(72) Inventor: Chad Garner, Jupiter, FL (US)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 211 days.

(21) Appl. No.: 15/961,194

(22) Filed: Apr. 24, 2018

(65) Prior Publication Data

US 2019/0063229 A1     Feb. 28, 2019

Related U.S. Application Data

(60) Provisional application No. 62/550,198, filed on Aug. 25, 2017.

(51) Int. Cl.
| | | |
|---|---|---|
| *F01D 5/14* | (2006.01) | |
| *F01D 5/18* | (2006.01) | |
| *F01D 5/30* | (2006.01) | |

(52) U.S. Cl.
CPC .............. *F01D 5/147* (2013.01); *F01D 5/187* (2013.01); *F01D 5/3007* (2013.01); *F05D 2220/32* (2013.01); *F05D 2230/21* (2013.01); *F05D 2230/31* (2013.01); *F05D 2240/304* (2013.01); *F05D 2240/80* (2013.01); *F05D 2260/202* (2013.01); *F05D 2260/204* (2013.01)

(58) Field of Classification Search
CPC ........ F01D 5/147; F01D 5/3007; F01D 5/187; F05D 2230/31; F05D 2260/204; F05D 2260/202; F05D 2240/304; F05D 2230/21; F05D 2240/80; F05D 2220/32
USPC ........................................................ 415/115
See application file for complete search history.

(56) References Cited

U.S. PATENT DOCUMENTS

| | | | | |
|---|---|---|---|---|
| 4,286,924 A | * | 9/1981 | Gale ....................... | F01D 5/187 415/115 |
| 4,326,833 A | * | 4/1982 | Zelahy .................... | B23P 6/005 29/402.13 |
| 4,832,252 A | * | 5/1989 | Fraser ..................... | B23P 6/005 228/119 |
| 6,200,092 B1 | * | 3/2001 | Koschier ................. | F01D 5/146 415/191 |
| 8,011,889 B1 | | 9/2011 | Liang | |
| 8,240,046 B2 | | 8/2012 | Peretti et al. | |
| 2008/0203236 A1 | * | 8/2008 | Mazzola .................. | F01D 5/18 244/35 R |
| 2010/0322760 A1 | | 12/2010 | Morrison et al. | |
| 2012/0222306 A1 | | 9/2012 | Mittendorf et al. | |

(Continued)

FOREIGN PATENT DOCUMENTS

EP            2781691 A1        9/2014

*Primary Examiner* — J. Todd Newton
(74) *Attorney, Agent, or Firm* — Invenstone Patent, LLC

(57) ABSTRACT

A turbine blade can include: a root; a platform disposed on the root; an airfoil disposed on the platform and including a leading edge and a trailing edge; and an additive trailing edge disposed on the trailing edge of the airfoil, wherein a first material of the trailing edge of the airfoil is different from a second material of the additive trailing edge, and wherein a first radius of the trailing edge is larger than a second radius of the additive trailing edge.

16 Claims, 7 Drawing Sheets

(56) References Cited

U.S. PATENT DOCUMENTS

| | | | |
|---|---|---|---|
| 2012/0255176 A1* | 10/2012 | Flesch | B22F 3/1055 |
| | | | 29/889.1 |
| 2013/0001837 A1 | 1/2013 | Göhler et al. | |
| 2014/0369852 A1 | 12/2014 | Zhang et al. | |
| 2016/0237827 A1 | 8/2016 | Campbell et al. | |
| 2016/0369634 A1 | 12/2016 | Slavens et al. | |
| 2017/0234138 A1* | 8/2017 | Bunker | F01D 9/041 |
| | | | 415/115 |
| 2017/0370222 A1* | 12/2017 | Bunker | B33Y 80/00 |

* cited by examiner

184

220

TURBINE BLADE HAVING AN ADDITIVE MANUFACTURING TRAILING EDGE

CROSS-REFERENCE TO RELATED APPLICATION

This application claims the benefit of U.S. Provisional Application Ser. No. 62/550,198, filed Aug. 25, 2017, which is incorporated herein by reference in its entirety.

BACKGROUND OF THE INVENTION

A gas turbine generally comprises a compressor, a combustor, and a turbine. The compressor provides compressed air generated by a plurality of compressor blades to the combustor, wherein the compressed air is high-temperature and high-pressure air. The combustor mixes the compressed air, introduced from the compressor, with fuel and combusts the mixed air. The combusted gas generated from the combustor is discharged to the turbine and a turbine blade of the turbine is rotated by the combusted gas, thereby generating power. The generated power is used in various fields such as for the generation of electricity and to drive machinery. The gas turbine is used to drive a generator, an aircraft, a locomotive, and the like.

A trailing edge of the turbine blade needs to have a small radius to reduce downstream eddy current and flow separation based on aerodynamics and to increase performance. By contrast, the trailing edge of the turbine blade needs to have a large radius for durability based on mechanical design because a trailing edge having a small radius is susceptible to the high transition stress, thereby inducing cracks in the trailing edge and causing a failure of the gas turbine. Thus, the radius of the trailing edge is compromised.

BRIEF SUMMARY

The present invention relates to a turbine blade for a gas turbine, more particularly, to a turbine blade including an additive manufacturing trailing edge disposed on a trailing edge.

In many embodiments, a turbine blade comprises an additive trailing edge disposed on a trailing edge of an airfoil such that a radius of the additive trailing edge is smaller than a radius of the trailing edge.

In an embodiment of the present invention, a turbine blade can include: a platform; an airfoil disposed on the platform and including a leading edge and a trailing edge; and an additive trailing edge disposed on the trailing edge of the airfoil, wherein a first radius of the trailing edge is larger than a second radius of the additive trailing edge.

In another embodiment of the present invention, a turbine blade can include: a root; a platform disposed on the root; an airfoil disposed on the platform and including a leading edge and a trailing edge; and an additive trailing edge disposed on the trailing edge of the airfoil, wherein a first material of the trailing edge of the airfoil is different from a second material of the additive trailing edge.

In yet another embodiment of the present invention, a method of manufacturing a turbine blade can include: providing an airfoil including a leading edge and a trailing edge; and forming an additive trailing edge on the trailing edge of the airfoil, wherein a first radius of the trailing edge is larger than a second radius of the additive trailing edge.

DETAILED DISCLOSURE

Figure 1:
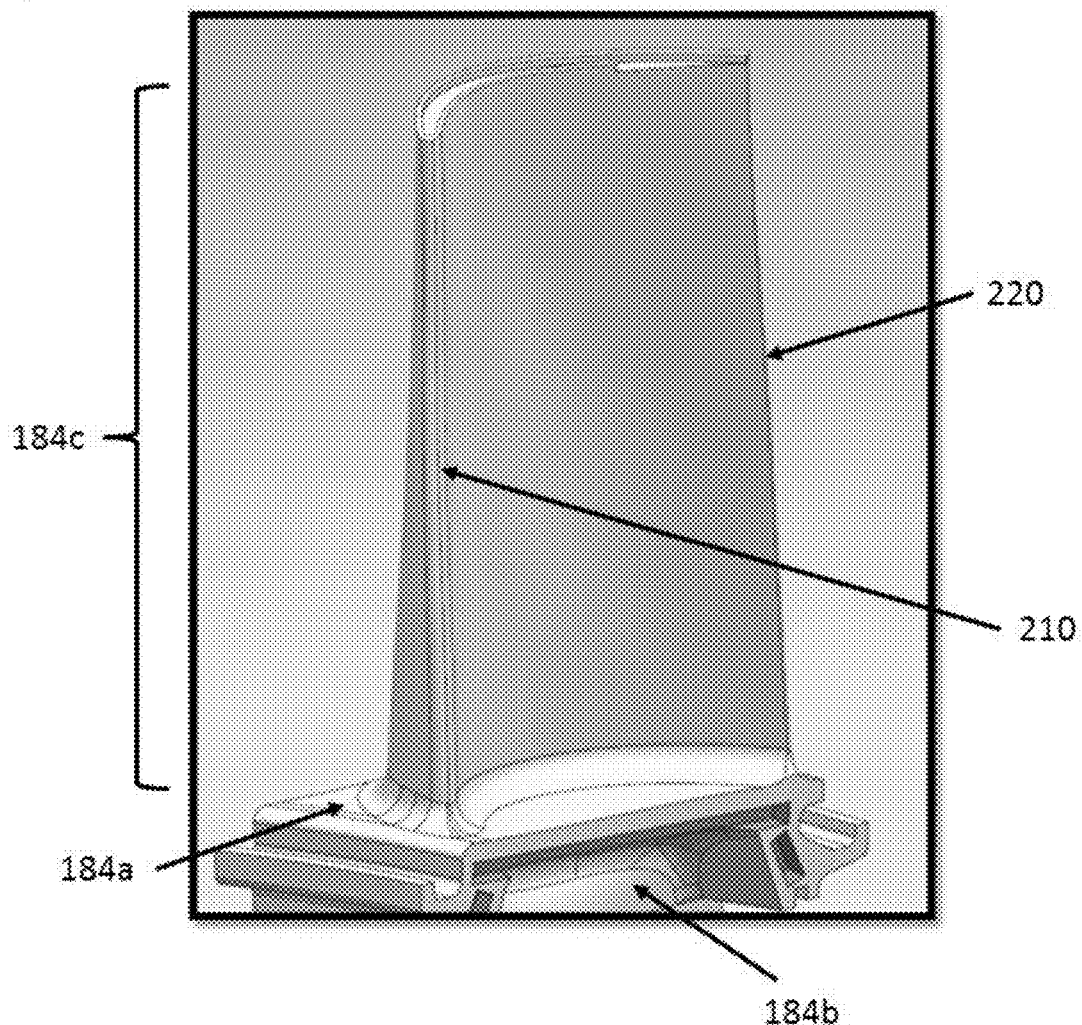
FIG. 1 shows a conventional turbine blade.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present. The terms "includes" and "including" are equivalent to "comprises" and "comprising", respectively.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated. In addition, the terms "first" and "second" can be selectively or exchangeably used for the members.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, a dimension of each of the elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted.

It is to be understood that the figures and descriptions of embodiments of the present invention have been simplified to illustrate elements that are relevant for a clear understanding of the invention, while eliminating (in certain cases), for purposes of clarity, other elements that may be well known. Those of ordinary skill in the art will recognize that other elements may be desirable and/or required in order to implement the present invention. However, because such elements are well known in the art, and because they do not facilitate a better understanding of the present invention, a discussion of such elements is not provided herein.

Figure 2:
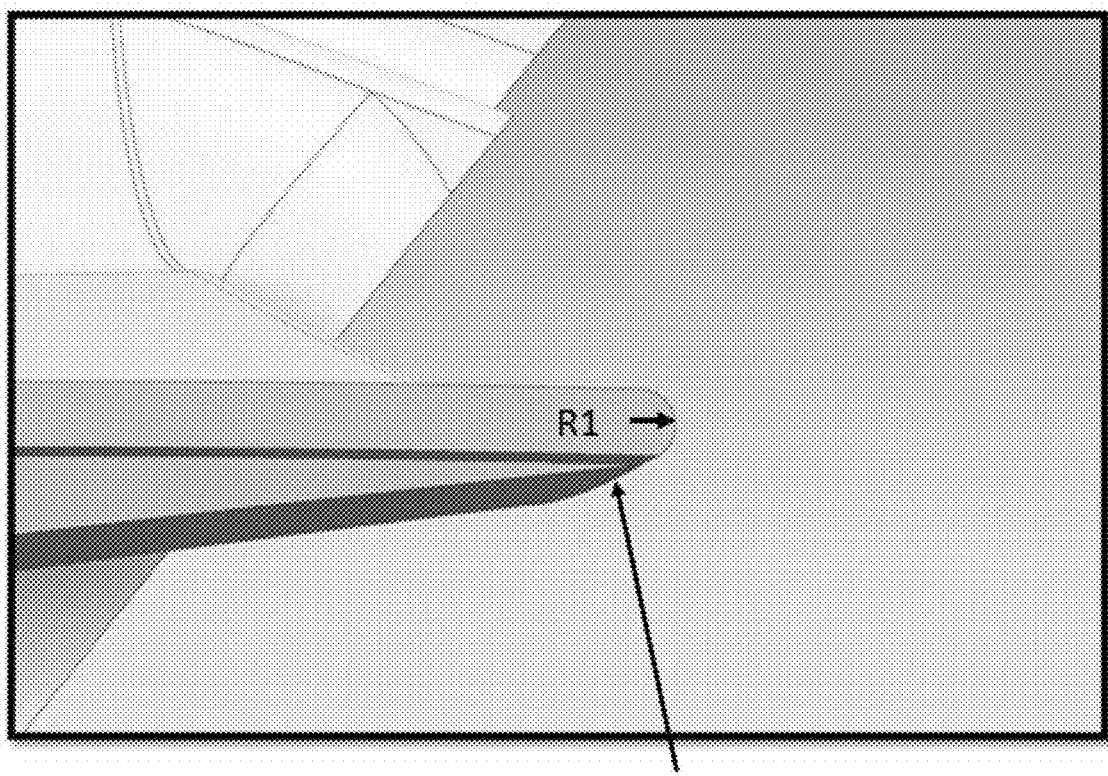
FIG. 2 shows a top view of a conventional turbine blade.

Reference will be made to the attached figures on which the same reference numerals are used throughout to indicate the same or similar components. FIG. 1 shows a conventional turbine blade. FIG. 2 shows a top view of a conventional turbine blade. Referring to FIGS. 1 and 2, a turbine blade 184 comprises a root 184*b*, a platform 184*a*, and an airfoil 184*c*. The root 184*b* is configured to be coupled with a turbine rotor disk, and the platform 184*a* is disposed on the root 184*b*. The airfoil 184*c* is disposed on the platform 184*b* and comprises a leading edge 210 and a trailing edge 220. Hot gas provided by a combustor flows from the leading edge 210 to the trailing edge 220, and the downstream eddy current and flow separation occur around the airfoil 184*c* based on aerodynamics of the hot gas. For high performance, the downstream eddy current and flow separation should be reduced; this can be achieved by allowing the trailing edge 220 to have a radius as small as possible. However, the small radius of the trailing edge 220 causes high transient stress on the trailing edge 220, thereby causing cracks in the trailing edge 220. Some parts can be broken from the trailing edge 220 and finally can cause failure of the gas turbine. Thus, the trailing edge radius needs to be compromised and has generally a radius R1 equal to or larger than 1 mm.

Figure 3:
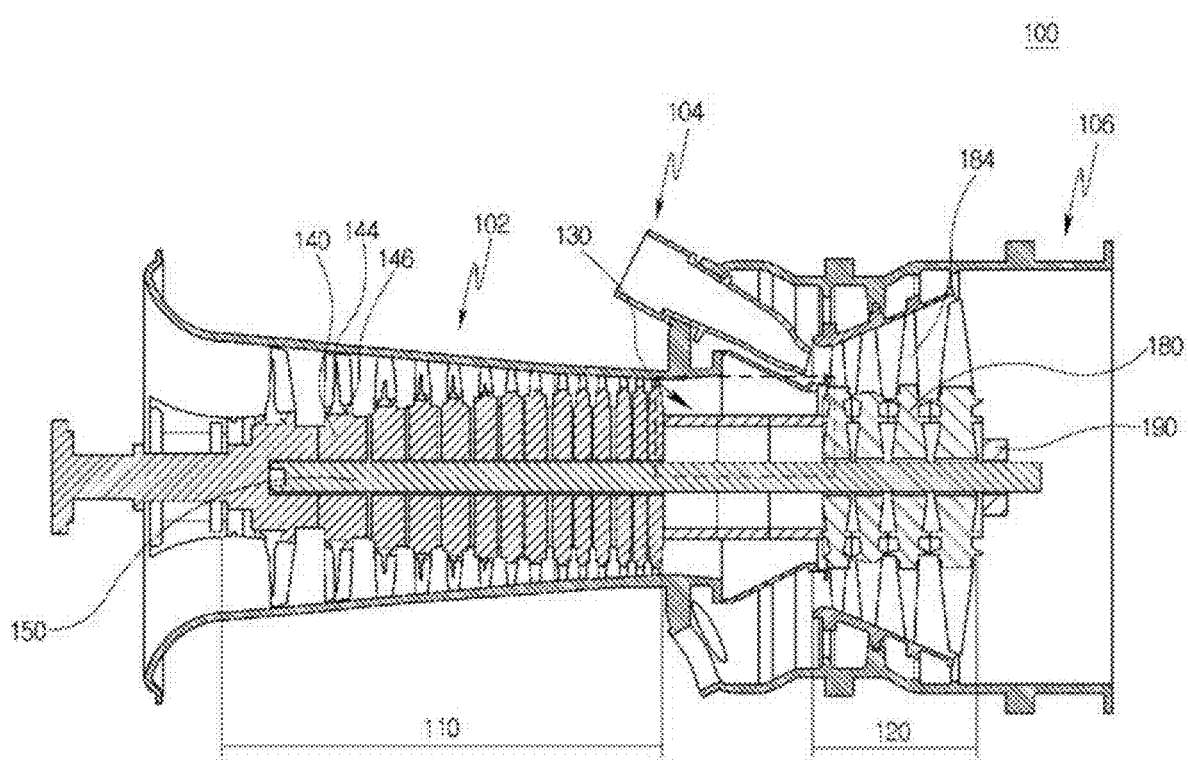
FIG. 3 shows a cross-sectional view of a gas turbine according to an embodiment of the present invention.
Figure 4:
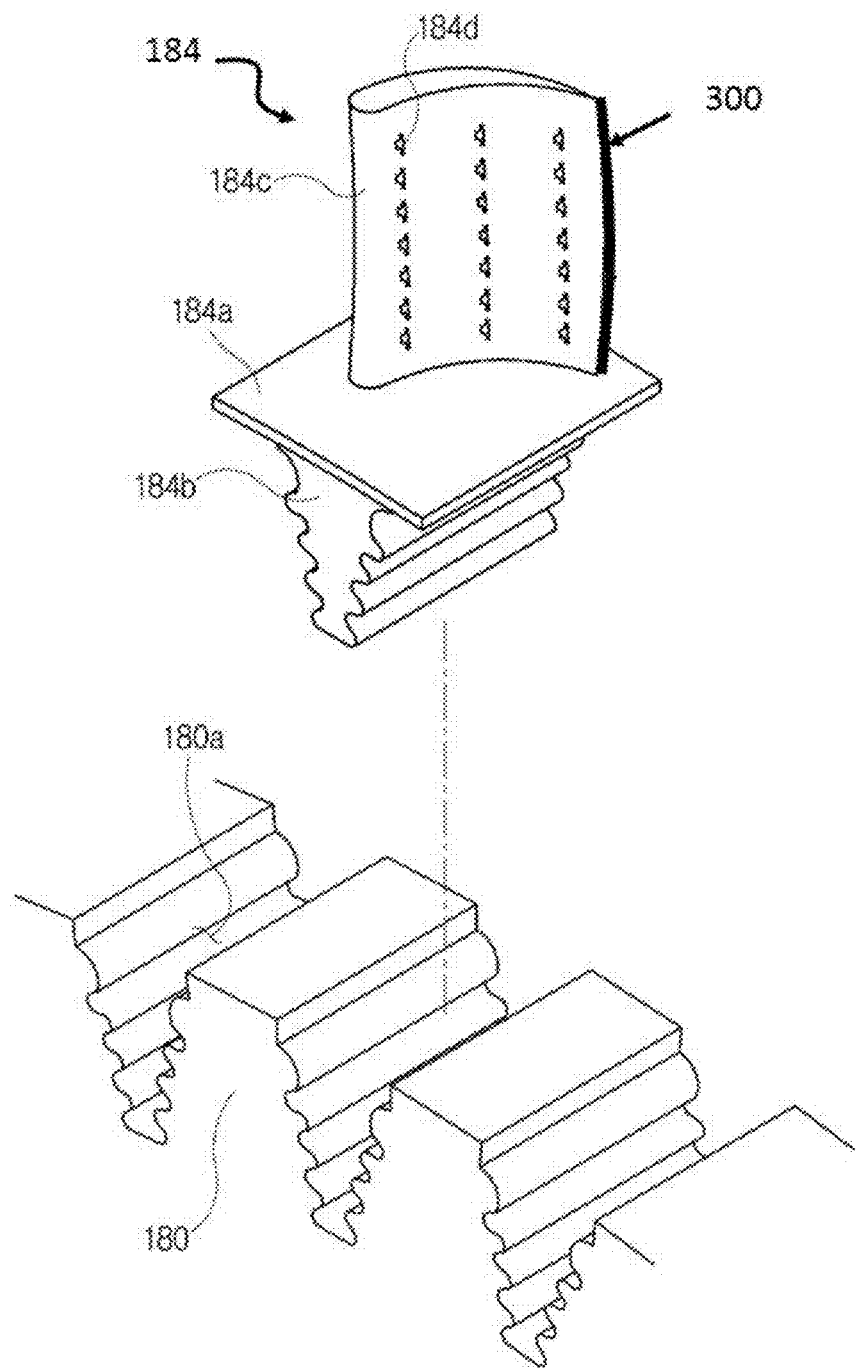
FIG. 4 shows a turbine rotor disk and a turbine blade according to an embodiment of the present invention.

On the other hand, embodiments of the present invention provide a turbine blade having a small radius by incorporating an additive trailing edge disposed on the trailing edge of the airfoil. FIG. 3 shows a cross-sectional view of a gas turbine according to an embodiment of the present invention. FIG. 4 shows a turbine rotor disk and a turbine blade according to an embodiment of the present invention. Referring to FIGS. 3 and 4, the gas turbine 100 according to an embodiment of the present invention comprises a compressor 110, a combustor 104, a turbine 120, a housing 102, and a diffuser 106.

The housing 102 covers the compressor 110 and the compressor 110 provides compressed air to the combustor 104. The combustor 104 generates hot gas using the compressed air and provides the hot gas to the turbine 120. The turbine 120 generates a rotation torque by using the hot gas provided by the combustor 104. The diffuser 106 is placed behind the turbine 120 and broadens the hot gas and reduces its speed. The gas turbine 100 further comprises a torque tube 130 between the compressor 110 and the turbine 120 in order to transfer the rotation torque generated by the turbine 120 to the compressor 110.

The compressor 110 includes a plurality of compressor blades 144, which are arranged on a plurality of compressor rotor disks 140 in a radial fashion. Each of the plurality of compressor blades 144 includes a compressor blade root 146 configured to be coupled with the compressor rotor disk 140 via a dove tail shape or a fir tree shape. The compressor 110 rotates the plurality of compressor blades 144, and air is thus moved while being compressed due to the rotation of the plurality of compressor blades 144. In an embodiment, the compressor 110 may be directly or indirectly connected to the turbine 120 so as to receive some of the power generated by the turbine 120, which is in turn used to rotate the plurality of compressor blades 144.

The air compressed in the compressor 110 is moved to the combustor 104. The combustor 104 includes a plurality of casings and a plurality of burners, which are arranged in a circular pattern. The combustor 104 comprises a combustion chamber defined by a liner, and fuel is provided through a fuel nozzle to the combustion chamber of the combustor 104. The compressed air is mixed with the fuel and then is combusted in the combustion chamber. Subsequently, the combusted hot gas is discharged to the turbine 120 so as to rotate a turbine blade 184 attached on a turbine rotor disk 180.

The gas turbine 100 further comprises a tie bolt 150 that is arranged to pass through the turbine rotor disk 180 and the compressor rotor disk 140. A first distal end of the tie bolt 150 is attached to a first compressor rotor disk of the plurality of compressor rotor disks 140 and a second distal end of the tie bolt 150 is fixed by a fixing nut 190. Facing surfaces of adjacent compressor rotor disks are compressed by the tie bolt 150 such that the adjacent compressor rotor disks do not rotate individually. The gas turbine 100 can comprise a vane attached on the housing 102 and placed between the plurality of compressor rotor disks 140.

The turbine 120 comprises the plurality of turbine rotor disk 180 and the plurality of turbine blades 184 coupled with the turbine rotor disk 180. Similar to the plurality of compressor blades 144, the plurality of turbine blades 184 are arranged on the turbine rotor disk 180 in a radial fashion. In addition, the plurality of turbine blades 184 are assembled to the turbine rotor disk 180 through a dove tail junction or fir tree junction.

Referring to FIGS. 3 and 4, the turbine rotor disk 180 has a disk shape and comprises a plurality of joint slots 180*a* on a circumferential surface. The joint slot 180*a* has a fir tree shape in this embodiment, but it can have a dovetail slot in another embodiment.

The turbine blade 184 comprises a platform 184*a* having a panel shape, a root 184*b* disposed below the platform 184*a*, and an airfoil 184*c* disposed on the platform 184*a*, wherein the root 184*b* is configured to be coupled with the joint slot 180*a* of the turbine rotor disk 180. Thus, the shape of the root 184*b* corresponds to the shape of the joint slot 180*a*. The airfoil 184*c* of the turbine blade 184 comprises a leading edge upstream and a trailing edge downstream based on a flow direction of the combusted hot gas. The turbine blade 184 further comprises an additive trailing edge 300 disposed on the trailing edge of the airfoil 184*c*.

The airfoil 184*c* is in contact with the combusted hot gas that has a high temperature of about 1700° C., and needs to be cooled down. Therefore, the airfoil 184*c* comprises a film cooling hole 184*d* on the side surface. The film cooling hole 184*d* communicates with a cooling passage disposed inside the airfoil 184*c* such that cooling air flows from the cooling passage to the side surface of the airfoil 184*c* through the film cooling hole 184*d*.

Figure 5:
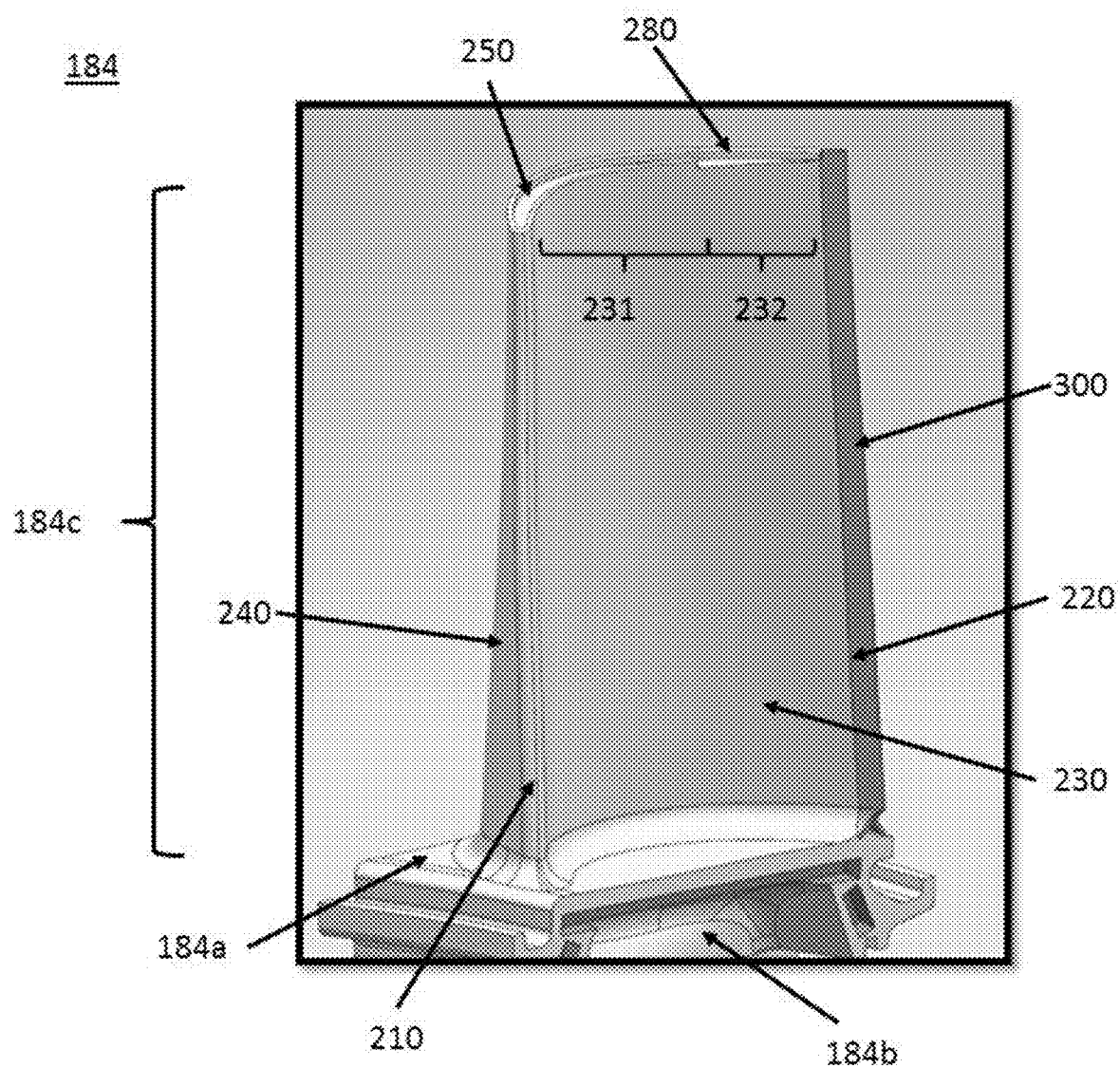
FIG. 5 shows a turbine blade according to an embodiment of the present invention.
Figure 6:
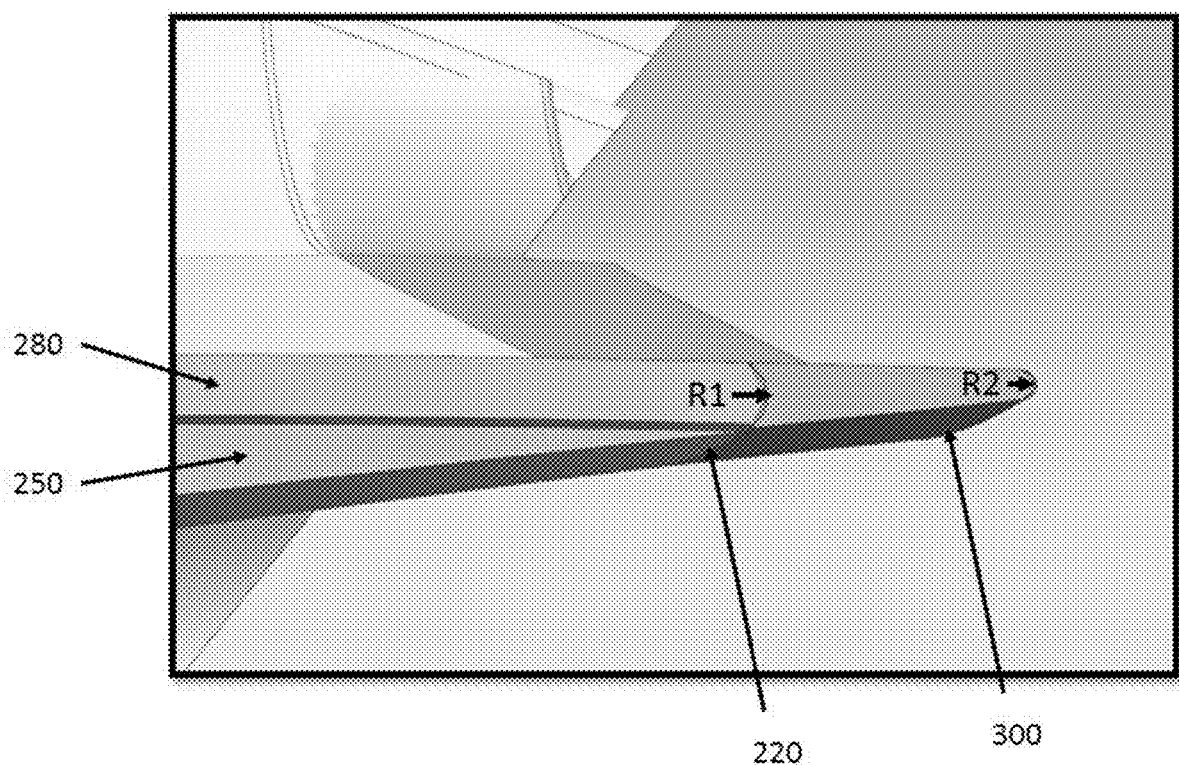
FIG. 6 shows a top view of a turbine blade according to an embodiment of the present invention.

FIG. 5 shows a turbine blade according to an embodiment of the present invention. FIG. 6 shows a top view of a turbine blade according to an embodiment of the present invention. Referring to FIGS. 5 and 6, the turbine blade 184 comprises the root 184*b*, the platform 184*a* disposed on the root 184*b*, and the airfoil 184*c* disposed on the platform 184*a*. The airfoil 184*c* comprises the leading edge 210 upstream, the trailing edge 220 downstream, and side surfaces including a pressure side surface 230 and a suction side surface 240. In addition, the airfoil 184*c* comprises a top surface 250 opposite to the platform 184*a* and a blade tip 280 on edge between the pressure side surface 230 and the top surface 250 and between the suction side surface 240 and the top surface 250. In particular, the blade tip 280 is formed from the leading edge 240 to the trailing edge 220 at the suction side surface 240 and formed at a pressure side first portion 231 close to the leading edge 210, but the blade tip 280 is not formed at a pressure side second portion 232 close to the trailing edge 220.

The turbine blade 184 further comprises the additive trailing edge 300 on the trailing edge 220 of the airfoil 184*c*. The additive trailing edge 300 is formed by a different material from the trailing edge 220 of the airfoil 183*c* at different manufacturing process step. The trailing edge 220 of the airfoil 183*c* is formed by a first material (e.g., casting material) at a casting process step. After forming the trailing edge 220, the additive trailing edge 300 is formed on the trailing edge 220 by a second material at an additive manufacturing process. For example, the additive manufacturing process can be a selective lase melting (SLM) (e.g., direct metal deposition) method where the second material is a metal. The second material can include a plurality of materials and the SLM can be performed repetitive on the same trailing edge 220. Preferably, the second material of the additive trailing edge 300 is more ductile than the first material of the trailing edge 220, and the additive trailing edge 300 has a second radius R2 smaller than the first radius R1 of the trailing edge 220. That is, the turbine blade 184 has the additive trailing edge 300 that is thinner than the original trailing edge 220 and more ductile than the original trailing edge 220. As the additive trailing edge 300 is manufactured by an additive manufacturing process to the airfoil 183c formed by a conventional casting, the process is very simple and cost-effective. In addition, the same additive manufacturing process for the additive trailing edge 300 can be also used for forming the blade tip 280. Before forming the additive trailing edge 300, a part of the trailing edge 220 can be removed for attachment of the additive trailing edge 300.

While the additive trailing edge 300 is disposed on the trailing edge 220, the additive trailing edge 300 is not disposed on the pressure side surface 230 and the suction side surface 240 such that the hot gas naturally flows from the leading edge 240 to the additive trailing edge 300. That is, the additive trailing edge 300 dose not surround the pressure side surface 230 and the suction side surface 240, and the thickest portion of the additive trailing edge 300 is not thicker than the thickness of the trailing edge 220. The additive trailing edge 300 can be in direct contact with the blade tip 280.

Figure 7:
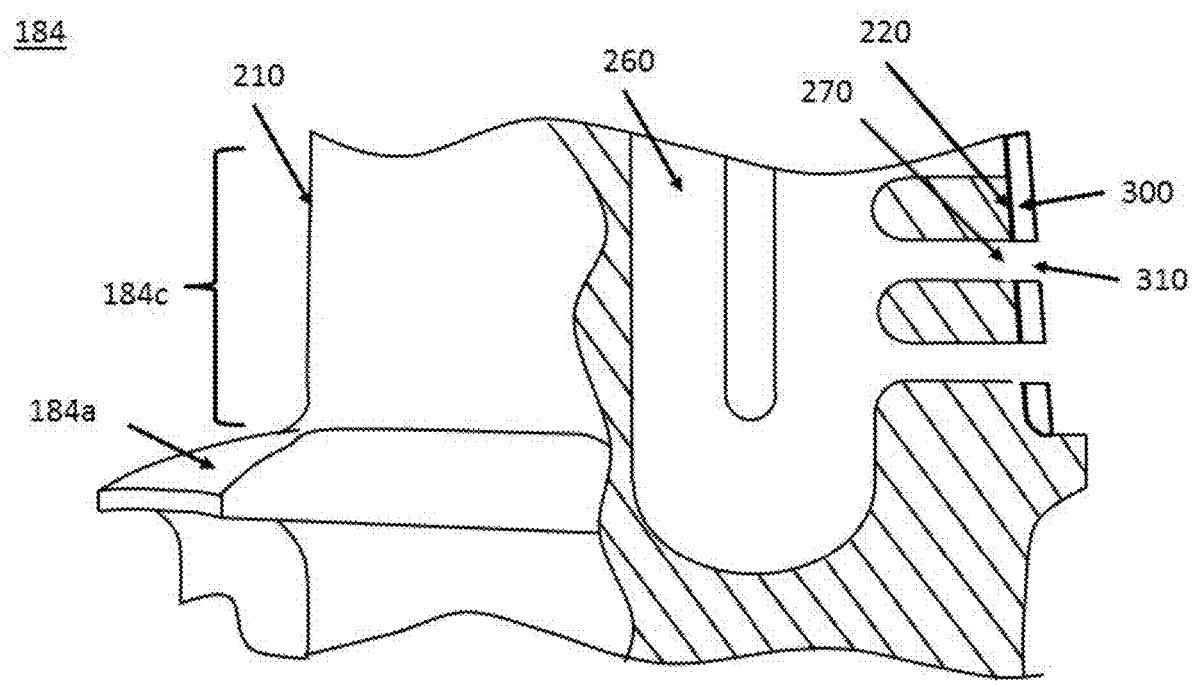
FIG. 7 shows a partial cross-sectional view of a turbine blade according to an embodiment of the present invention.

FIG. 7 shows a partial cross-sectional view of a turbine blade according to an embodiment of the present invention. Referring to FIG. 7, the turbine blade 184 further comprises a cooling passage 260 inside the airfoil 184c and a cooling slot 270 on the trailing edge 220, wherein the cooling slot 270 communicates with the cooling passage 260 such that a coolant (e.g., cool air) passes through the cooling passage 260 and flows out the cooling slot 270.

The additive trailing edge 300 comprises a micro channel 310 connected to the cooling slot 270 such that the coolant provided by the cooling slot 270 flows out.

The subject invention includes, but is not limited to, the following exemplified embodiments.

Embodiment 1. A turbine blade, comprising:
a platform;
an airfoil disposed on the platform and including a leading edge and a trailing edge; and
an additive trailing edge disposed on the trailing edge of the airfoil,
wherein a first radius of the trailing edge is larger than a second radius of the additive trailing edge.

Embodiment 2. The turbine blade according to embodiment 1, wherein the additive trailing edge is more ductile than the trailing edge of the airfoil.

Embodiment 3. The turbine blade according to any of embodiments 1-2, wherein a first material of the trailing edge of the airfoil is different from a second material of the additive trailing edge.

Embodiment 4. The turbine blade according to any of embodiments 1-3, wherein the airfoil comprises a pressure side surface, a suction side surface, and a top surface, and a blade tip is formed on an edge between the pressure side surface and the top surface and between the suction side surface and the top surface.

Embodiment 5. The turbine blade according to embodiment 4, wherein the blade tip is in direct contact with the additive trailing edge.

Embodiment 6. The turbine blade according to any of embodiments 4-5, wherein the airfoil comprises a film cooling hole formed on the pressure side surface.

Embodiment 7. The turbine blade according to any of embodiments 1-6, further comprising a cooling passage inside the airfoil, a cooling slot connecting the cooling passage to the trailing edge, and a micro channel connected to the cooling slot and passing through the additive trailing edge.

Embodiment 8. A turbine, comprising:
a turbine rotor disk including a joint slot; and
the turbine blade according to any of embodiments 1-7,
wherein the turbine blade comprises a root disposed on the platform, and
wherein the root of the turbine blade is coupled with the joint slot of the turbine rotor disk.

Embodiment 9. A gas turbine, comprising:
a compressor providing compressed air;
a combustor receiving the compressed air and producing combusted gas; and
the turbine according to embodiment 8,
wherein the turbine receives the combusted gas from the combustor.

Embodiment 10. A turbine blade, comprising:
a root;
a platform disposed on the root;
an airfoil disposed on the platform and including a leading edge and a trailing edge; and
an additive trailing edge disposed on the trailing edge of the airfoil,
wherein a first material of the trailing edge of the airfoil is different from a second material of the additive trailing edge.

Embodiment 11. The turbine blade according to embodiment 10, wherein the additive trailing edge is more ductile than the trailing edge of the airfoil.

Embodiment 12. The turbine blade according to any of embodiments 10-11, wherein a first radius of the trailing edge is larger than a second radius of the additive trailing edge.

Embodiment 13. The turbine blade according to any of embodiments 10-12, wherein the additive trailing edge comprises a micro channel connected to a cooling slot of the airfoil.

Embodiment 14. The turbine blade according to any of embodiments 10-13, wherein the airfoil comprises a blade tip formed on a top surface of the airfoil.

Embodiment 15. A method of manufacturing a turbine blade, comprising:
providing an airfoil including a leading edge and a trailing edge; and
forming an additive trailing edge on the trailing edge of the airfoil,
wherein a first radius of the trailing edge is larger than a second radius of the additive trailing edge.

Embodiment 16. The method according to embodiment 15, wherein the airfoil is formed by a casting.

Embodiment 17. The method according to any of embodiments 15-16, wherein the additive trailing edge is formed by a selective laser melting (SLM).

Embodiment 18. The method according to any of embodiments 15-17, wherein the additive trailing edge includes a plurality of materials.

Embodiment 19. The method according to any of embodiments 15-18, wherein the additive trailing edge is more ductile than the trailing edge of the airfoil.

Embodiment 20. The method according to any of embodiments 15-19, further comprising removing a part of the trailing edge before forming the additive trailing edge.

Embodiment 21. The method according to embodiment 15, wherein the turbine blade comprises a root and a platform disposed on the root and placed between the root and the airfoil, and the root, the platform, and the airfoil are formed by a casting.

Embodiment 22. The method according to embodiment 15, wherein the turbine blade comprises a blade tip disposed on the airfoil.

Embodiment 23. The method according to embodiment 22, wherein the blade tip is formed by a casting or a selective laser melting.

Embodiment 24. The turbine blade according to any of embodiments 1-7, wherein the additive trailing edge is thinner than the trailing edge.

Embodiment 25. The turbine blade according to any of embodiment 4, wherein the pressure side surface comprises a pressure side first portion adjacent the leading edge and a pressure side second portion adjacent trailing edge.

Embodiment 26. The turbine blade according to embodiment 25, wherein the blade tip is formed on an edge between the top surface and the pressure side first portion and the blade tip is not formed on an edge between the top surface and the pressure side second portion.

It should be understood that the examples and embodiments described herein are for illustrative purposes only and that various modifications or changes in light thereof will be suggested to persons skilled in the art and are to be included within the spirit and purview of this application. Thus, the invention is not intended to limit the examples described herein, but is to be accorded the widest scope consistent with the principles and novel features disclosed herein.

What is claimed is:

1. A turbine blade, comprising:
   a platform;
   an airfoil disposed on the platform and including a leading edge and a first trailing edge; and
   a second trailing edge additionally disposed on the first trailing edge of the airfoil,
   wherein a radius of the first trailing edge is larger than a radius of the second trailing edge,
   wherein the airfoil comprises a pressure side surface, a suction side surface, and a top surface, and a blade tip is formed on an edge between the pressure side surface and the top surface and between the suction side surface and the top surface, and
   wherein the blade tip is in direct contact with the second trailing edge.

2. The turbine blade according to claim 1, wherein the second trailing edge is more ductile than the first trailing edge of the airfoil.

3. The turbine blade according to claim 1, wherein a material of the first trailing edge of the airfoil is different from a material of the second trailing edge.

4. The turbine blade according to claim 1, wherein the airfoil comprises a film cooling hole formed on the pressure side surface.

5. The turbine blade according to claim 1, further comprising a cooling passage inside the airfoil, a cooling slot connecting the cooling passage to the first trailing edge, and a micro channel connected to the cooling slot and passing through the second trailing edge.

6. A turbine, comprising:
   a turbine rotor disk including a joint slot; and
   the turbine blade according to claim 1,
   wherein the turbine blade is coupled with the joint slot of the turbine rotor disk.

7. A gas turbine, comprising:
   a compressor providing compressed air;
   a combustor receiving the compressed air and producing combusted gas; and
   the turbine according to claim 6,
   wherein the turbine receives the combusted gas from the combustor.

8. A turbine blade, comprising:
   a root;
   a platform disposed on the root;
   an airfoil disposed on the platform and including a leading edge and a first trailing edge; and
   a second trailing edge additionally disposed on the first trailing edge of the airfoil,
   wherein a material of the first trailing edge of the airfoil is different from a material of the second trailing edge,
   wherein the airfoil comprises a pressure side surface, a suction side surface, and a top surface, and a blade tip is formed on an edge between the pressure side surface and the top surface and between the suction side surface and the top surface, and
   wherein the blade tip is in direct contact with the second trailing edge.

9. The turbine blade according to claim 8, wherein the second trailing edge is more ductile than the first trailing edge of the airfoil.

10. The turbine blade according to claim 9, wherein a radius of the first trailing edge is larger than a radius of the second trailing edge.

11. The turbine blade according to claim 10, wherein the second trailing edge comprises a micro channel connected to a cooling slot of the airfoil.

12. The turbine blade according to claim 11, wherein the airfoil comprises a blade tip formed on a top surface of the airfoil.

13. A method of manufacturing a turbine blade, comprising:
   providing an airfoil including a leading edge and a first trailing edge; and
   additionally forming a second trailing edge on the first trailing edge of the airfoil,
   wherein a radius of the first trailing edge is larger than a radius of the second trailing edge, and
   wherein the airfoil is formed by a casting and the second trailing edge is formed by a selective laser melting (SLM).

14. The method according to claim 13, wherein the second trailing edge includes a plurality of materials.

15. The method according to claim 13, wherein the second trailing edge is more ductile than the first trailing edge of the airfoil.

16. The method according to claim 13, further comprising removing a part of the first trailing edge before forming the second trailing edge.

* * * * *